(12) United States Patent
Masuda et al.

(10) Patent No.: US 12,732,063 B2
(45) Date of Patent: Sep. 8, 2026

(54) MOTOR AND SPEED REDUCER HOUSING WITH COOLING FOR AN ELECTRIC VEHICLE

(71) Applicants: TOYOTA JIDOSHA KABUSHIKI KAISHA, Aichi-ken (JP); Aisin Corporation, Aichi-ken (JP)

(72) Inventors: Yuto Masuda, Toyota (JP); Koichi Okuda, Toyota (JP); Taiki Owari, Kariya (JP); Toshihisa Mizutani, Kariya (JP)

(73) Assignees: TOYOTA JIDOSHA KABUSHIKI KAISHA, Aichi-Ken (JP); AISIN CORPORATION, Aichi-Ken (JP)

( * ) Notice: Subject to any disclaimer, the term of this patent is extended or adjusted under 35 U.S.C. 154(b) by 250 days.

(21) Appl. No.: 18/540,882

(22) Filed: Dec. 15, 2023

(65) Prior Publication Data

US 2024/0204612 A1 Jun. 20, 2024

(30) Foreign Application Priority Data

Dec. 19, 2022 (JP) ................................. 2022-202572

(51) Int. Cl.
*H02K 7/116* (2006.01)
*H02K 5/20* (2006.01)

(52) U.S. Cl.
CPC ............... *H02K 7/116* (2013.01); *H02K 5/20* (2013.01)

(58) Field of Classification Search
CPC ...... B60K 1/00; B60K 1/02; B60K 2001/006; B60K 2001/003; B60K 11/00; B60K 11/02; B60K 17/00; B60K 17/06; F16H 57/04; H02K 7/116; H02K 7/10; H02K 7/00; H02K 5/20; H02K 5/04; H02K 5/00; H02K 5/203; H02K 9/19; H02K 9/00
See application file for complete search history.

(56) References Cited

U.S. PATENT DOCUMENTS 5,127,485 A * 7/1992 Wakuta ................ B60K 7/0007 310/67 R
6,329,731 B1 * 12/2001 Arbanas ................ F16H 57/043 310/58

(Continued)

FOREIGN PATENT DOCUMENTS

JP 2006-240429 A 9/2006
JP 2017-007649 A 1/2017

(Continued)

*Primary Examiner* — James M Dolak
(74) *Attorney, Agent, or Firm* — HAUPTMAN HAM, LLP

(57) ABSTRACT

A driving apparatus for an electric vehicle includes (a) an electric motor including a rotary shaft and a rotor that is rotatably supported by the rotary shaft, (b) a speed reducer configured to reduce a speed of rotation of the rotary shaft of the electric motor and to output the rotation of the rotary shaft, and (c) a housing that houses the electric motor and the speed reducer. The housing is partitioned by a partition wall into an electric motor room in which the electric motor is housed and a speed reducer room in which the speed reducer is housed. A first refrigerant used in the electric motor room and a second refrigerant used in the speed reducer room are different from each other. At least a part of the speed reducer room is received in the electric motor room in an axial direction of the rotary shaft.

8 Claims, 2 Drawing Sheets

(56) References Cited

U.S. PATENT DOCUMENTS

| | | | | |
|---|---|---|---|---|
| 7,156,195 | B2 * | 1/2007 | Yamagishi | F16H 57/0476 310/60 A |
| 7,775,060 | B2 * | 8/2010 | Nakajima | B60L 1/02 62/505 |
| 9,705,378 | B2 * | 7/2017 | Suzuki | H02K 7/116 |
| 10,511,210 | B2 * | 12/2019 | Yu | F01M 5/005 |
| 11,137,061 | B2 * | 10/2021 | Ishikawa | F16H 57/0441 |
| 11,413,946 | B2 * | 8/2022 | Absenger | F16H 57/045 |
| 11,585,352 | B2 * | 2/2023 | Tominaga | F16J 15/3404 |
| 11,623,508 | B2 * | 4/2023 | Oechslen | H05K 7/20927 310/54 |
| 11,773,962 | B1 * | 10/2023 | Vanderlip | F16H 57/0476 74/606 A |
| 11,837,940 | B2 * | 12/2023 | Nakata | F16H 57/0424 |
| 11,873,897 | B2 * | 1/2024 | Nakamatsu | F16H 57/0424 |
| 12,305,745 | B2 * | 5/2025 | Ito | F16H 57/029 |
| 12,578,013 | B2 * | 3/2026 | Francis | F16H 57/0441 |
| 12,592,605 | B2 * | 3/2026 | Torii | H02K 5/20 |
| 12,595,843 | B2 * | 4/2026 | Gassmann | F16H 57/0476 |
| 12,603,541 | B2 * | 4/2026 | Mogro Zambrano | H02K 5/203 |
| 12,603,552 | B2 * | 4/2026 | Wilson, Jr. | H02K 11/40 |
| 12,603,555 | B2 * | 4/2026 | Padovan | H02K 16/02 |
| 2006/0219449 | A1 | 10/2006 | Mizutani et al. | |
| 2016/0375755 | A1 | 12/2016 | Martina et al. | |
| 2022/0018354 | A1 | 1/2022 | Tominaga et al. | |
| 2023/0069613 | A1 * | 3/2023 | Osuga | H02K 7/083 |

FOREIGN PATENT DOCUMENTS

| | | |
|---|---|---|
| JP | 2019-193440 A | 10/2019 |
| JP | 2022-018909 A | 1/2022 |

* cited by examiner

MOTOR AND SPEED REDUCER HOUSING WITH COOLING FOR AN ELECTRIC VEHICLE

This application claims priority from Japanese Patent Application No. 2022-202572 filed on Dec. 19, 2022, the disclosure of which is herein incorporated by reference in its entirety.

FIELD OF THE INVENTION

The present invention relates to a driving apparatus for an electric vehicle, and particularly to a technique for reducing a total length of the driving apparatus.

BACKGROUND OF THE INVENTION

A conventional driving apparatus for an electric vehicle includes a housing in which an electric motor and a speed reducer are housed. The electric motor includes a rotary shaft and a rotor that is rotatably supported by the rotary shaft. The speed reducer is configured to reduce a speed of rotation of the rotary shaft of the electric motor and to output the rotation of the rotary shaft toward drive wheels. The housing is partitioned by a partition wall into an electric motor room in which the electric motor is housed and a speed reducer room in which the speed reducer is housed. A refrigerant used in the electric motor room and a refrigerant used in the speed reducer room are different from each other. JP-2022-018909A discloses an example of such a driving apparatus for an electric vehicle.

SUMMARY OF THE INVENTION

In the above-described conventional driving apparatus for an electric vehicle, the refrigerant used in the electric motor room is a refrigerant which is exclusive for an electric motor and which has an excellent property for cooling the electric motor so as to increase an efficiency of cooling the electric motor, while the refrigerant used in the speed reducer room is a refrigerant such as a lubricant oil which is exclusive for a speed reducer and which has an excellent property for suppressing a stirring resistance to the speed reducer and for lubricating and cooling the speed reducer so as to increase efficiency of running of the vehicle and durability of the speed reducer.

However, in the above-described conventional driving apparatus, a total length of the housing in a direction of the rotary shaft of the electric motor is not reduced, so that there is a problem that a sufficient mountability of the driving apparatus is not necessarily obtained, particularly, in a small-sized electric vehicle.

The present invention was made in view of the background art described above. It is therefore an object of the present invention to provide a driving apparatus for a vehicle in which a total length of a housing in a direction of a rotary shaft of an electric motor is reduced.

The object indicated above is achieved according to the following aspects of the present invention.

According to a first aspect of the present invention, there is provided a driving apparatus for an electric vehicle. The driving apparatus includes: (a) an electric motor including a rotary shaft and a rotor that is rotatably supported by the rotary shaft; (b) a speed reducer configured to reduce a speed of rotation of the rotary shaft of the electric motor and to output the rotation of the rotary shaft; and (c) a housing that houses the electric motor and the speed reducer. The housing is partitioned by a partition wall into an electric motor room in which the electric motor is housed and a speed reducer room in which the speed reducer is housed. A first refrigerant used in the electric motor room and a second refrigerant used in the speed reducer room are different from each other. At least a part of the speed reducer room enters or is received in the electric motor room in an axial direction of the rotary shaft.

In the first aspect of the present invention, at least the part of the speed reducer room enters or is received in the electric motor room in the axial direction of the rotary shaft of the electric motor, so that a length of the housing in the axial direction of the rotary shaft can be reduced by an amount by which at least the part of the speed reducer room enters or is received in the electric motor room in the axial direction of the rotary shaft. Thus, it is possible to increase mountability of the driving apparatus, particularly, in a small-sized electric vehicle.

According to a second aspect of the invention, in the driving apparatus according to the first aspect of the invention, a space is defined by a part of the electric motor room, wherein the part of the electric motor room overlaps with at least the part of the speed reducer room as viewed in a radial direction of the rotary shaft. A power cable connected to the electric motor and/or a fluid pump configured to supply the first refrigerant into the electric motor room is provided in the space. Thus, at least one component required to operate the driving apparatus also is housed in the electric motor room, and overlaps with the speed reducer room in the axial direction of the rotary shaft, so that the driving apparatus can be made more compact.

According to a third aspect of the invention, in the driving apparatus according to the first aspect of the invention, there are further provided a second electric motor in addition to the electric motor as a first electric motor; and a second speed reducer in addition to the speed reducer as a first speed reducer. The first and second electric motors are housed in the electric motor room, and are located in respective positions that are symmetrical to each other with respect to a widthwise center line of the electric motor room. The first and second speed reducers are housed in the speed reducer room, and are located in respective positions that are symmetrical to each other with respect to the widthwise center line. Each of the first and second speed reducers includes: an input shaft connected in series to a corresponding one of the first and second electric motors; a counter shaft disposed in parallel to the input shaft; an output shaft disposed perpendicular to the counter shaft, and a pair of reduction gears which are disposed between the counter shaft and the output shaft and which consist of hypoid gears. Thus, a pair of drive wheels are to be driven by the two electric motors, respectively, independently of each other, so that a differential gear device is not required.

BRIEF DESCRIPTION OF THE DRAWINGS

FIG. 3 is a view schematically showing a driving apparatus for an electric vehicle, which is constructed according to a third embodiment of the present invention.

DETAILED DESCRIPTION OF PREFERRED EMBODIMENTS

There will be described embodiments of the present invention in details with reference to drawings.

First Embodiment

Figure 1:
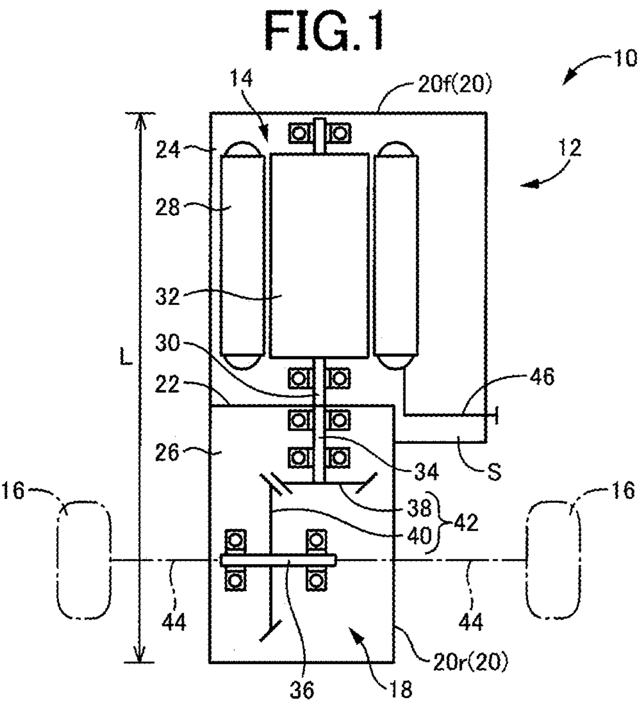
FIG. 1 is a view schematically showing a driving apparatus for an electric vehicle, which is constructed according to a first embodiment of the present invention.

FIG. 1 is a view schematically showing a driving apparatus 12 for an electric vehicle 10, which is constructed according to a first embodiment of the present invention. As shown in FIG. 1, the driving apparatus 12 includes an electric motor 14 as a drive power source for driving the electric vehicle 10, a speed reducer 18 configured to reduce a speed of rotation of the electric motor 14 and to output the rotation toward drive wheels 16, and a housing 20 that houses the electric motor 14 and the speed reducer 18. The housing 20 is partitioned by a partition wall 22 into an electric motor room 24 in which the single electric motor 14 is housed and a speed reducer room 26 in which the single speed reducer 18 is housed. The speed reducer room 26 is adjacent to the electric motor room 24 in an axial direction of a rotary shaft 30 of the electric motor 14.

The electric motor 14 includes a tubular-shaped stator 28 and a rotor 32. The stator 28 is disposed in a fixed position. The rotor 32 is rotatably supported by the rotary shaft 30 that is located on an inner peripheral side of the rotor 32. The rotary shaft 30 and an input shaft 34 of the speed reducer 18 are connected in series to each other through the partition wall 22 that is made liquid-tight by a seal (not shown).

The speed reducer 18 includes the input shaft 34, an output shaft 36 and a pair of reduction gears 42. The input shaft 34 is connected in series to the rotary shaft 30 of the electric motor 14. The output shaft 36 is rotatably disposed perpendicular to the input shaft 34. The pair of reduction gears 42 consist of a small-diameter bevel gear 38 and a large-diameter bevel gear 38 that mesh with each other. The small-diameter bevel gear 38 is fixed to an axial end portion of the input shaft 34, while the large-diameter bevel gear 40 is fixed to the output shaft 36. Each of the small-diameter bevel gear 38 and the large-diameter bevel gear 40 is preferably a hypoid gear. The output shaft 36 is connected to the pair of drive wheels 16 through axles 44. The speed reducer 18 is configured to reduce a speed of rotation of the electric motor 14 and to transmit the rotation toward the drive wheels 16. The large-diameter bevel gear 40 is provided with a known differential gear device (not shown).

A first refrigerant used in the electric motor room 24 and a second refrigerant used in the speed reducer room 26 are different in kind from each other. The first refrigerant provided in the electric motor room 24 is a liquid oil that has electrical insulation properties and is specialized for cooling, and may also be a lubricant oil. The first refrigerant accumulated in a bottom portion of electric motor room 24 is pumped to a radiator (not shown) by, for example, a pump (not shown). The first refrigerant that has passed through a radiator is injected toward the electric motor 14 from a cooling pipe (not shown) provided on the electric motor 14. The first refrigerant is then returned to the bottom portion of the electric motor room 24.

The second refrigerant provided in the speed reducer room 26 is a lubricant oil, which is a liquid oil specialized for lubrication so as to lubricate the speed reducer 18. The second refrigerant accumulated in a bottom portion of the speed reducer room 26 is scraped up, for example, by the large-diameter bevel gear 40 that is rotated, and lubricates meshing portions of the small-diameter bevel gear 38 and the large-diameter bevel gear 40, for example. Where each of the small-diameter bevel gear 38 and the large-diameter bevel gear 40 is the hypoid gear, a lubricant oil suitable for lubricating the hypoid gear is selected as the second refrigerant.

The housing 20 includes a first housing portion **20*f* and a second housing portion 20*r* that define the electric motor room 24 and the speed reducer room 26, respectively. The first housing portion 20*f* and the second housing portion 20*r* are combined and fastened at their mutually opposed portions to each other, such that an end portion of the second housing portion 20*r* is inserted or received in the first housing portion 20*f*. The electric motor room 24 has a width larger than a width of the speed reducer room 26, wherein the width of each of the electric motor room 24 and the speed reducer room 26 is a dimension measured in a lateral direction of the vehicle 10 that is perpendicular to a longitudinal direction of the vehicle 10 in which the vehicle 10 is to run. The above-described end portion of the second housing portion 20*r* enters into the first housing portion 20*f* against a part of an opposed surface of the electric motor room 24 opposed to the speed reducer room 26. A part of the speed reducer room 26 overlaps with electric motor room 24 as viewed in a radial direction of the rotary shaft 30**.

Thus, there is a space S that is defined by a part of the electric motor room 24, wherein the part of the electric motor room 24 overlaps with the above-described part of the speed reducer room 26 as viewed in the radial direction of the rotary shaft 30. That is, the space S is defined by a part of the first housing portion **20*f*, wherein the part of the first housing portion 20*f* overlaps with a part of the second housing portion 20*r* as viewed in the radial direction of the rotary shaft 30. In the space S, a plurality of power cables 46 are provided to supply an electric power to the electric motor 14 or to take the electric power regenerated by the electric motor 14. It is preferable that a power-cable connection portion as well as the power cables 46** is provided in the space S.

In the driving apparatus 12 of the present embodiment, the part of the speed reducer room 26, which corresponds to one of opposite end portions of the speed reducer room 26 that is closer to the electric motor 14, enters or is received in the electric motor room 24 in the axial direction of the rotary shaft 30 of the electric motor 14, so that the total length L of the housing 20 in the axial direction of the rotary shaft 30 can be reduced by an amount by which the part of the speed reducer room 26 enters or is received in the electric motor room 24 in the axial direction of the rotary shaft 30. Thus, it is possible to increase mountability of the driving apparatus, particularly, in a small-sized electric vehicle.

Further, in the driving apparatus 12 of the present embodiment, the space S is defined by a part of the electric motor room 24, wherein the part of the electric motor room 24 overlaps with the part of the speed reducer room 26 as viewed in the radial direction of the rotary shaft 30 of the electric motor 14. The power cables 46 connected to the electric motor 14 are provided in the space S. Thus, the component required to operate the driving apparatus 12 also is housed in the electric motor room 24, and overlaps with the speed reducer room 26 in the axial direction of the rotary shaft 30, so that the driving apparatus 12 can be made more compact.

There will be described other embodiments of this invention. The same reference signs as used in the above-described embodiment will be used in the following embodiments, to identify the practically corresponding elements, and descriptions thereof are not provided.

Second Embodiment

Figure 2:
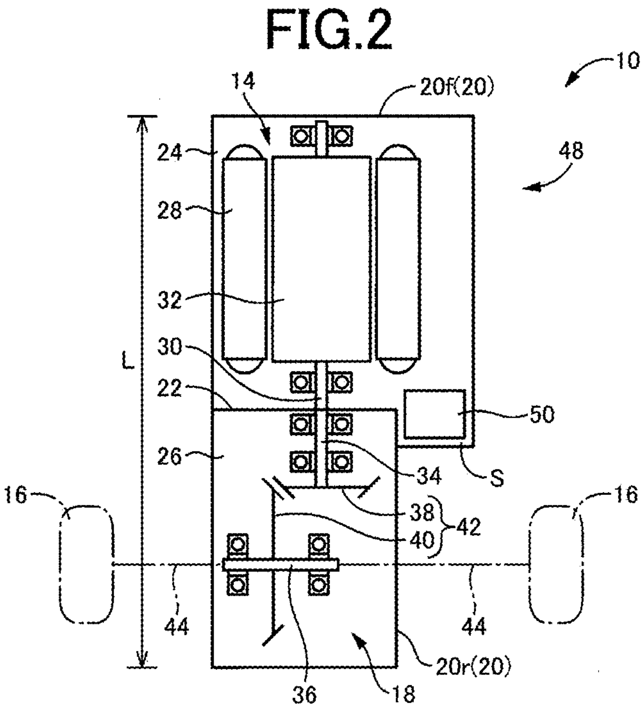
FIG. 2 is a view schematically showing a driving apparatus for an electric vehicle, which is constructed according to a second embodiment of the present invention.

FIG. 2 is a view schematically showing a driving apparatus 48 for the electric vehicle 10, which is constructed according to a second embodiment of the present invention. As shown in FIG. 2, the driving apparatus 48 is substantially the same as the driving apparatus 12 of the first embodiment shown in FIG. 1, except that a fluid pump in the form of an oil pump 50 is provided in the space S that is defined by the part of the electric motor room 24 in which the first housing portion 20*f* and the second housing portion 20*r* overlap with each other. The oil pump 50 is provided to circulate the first refrigerant in the electric motor room 24.

In the driving apparatus 48 of this second embodiment, too, the part of the speed reducer room 26, which corresponds to one of opposite end portions of the speed reducer room 26 that is closer to the electric motor 14, enters or is received in the electric motor room 24 in the axial direction of the rotary shaft 30 of the electric motor 14, so that the total length L of the housing 20 in the axial direction of the rotary shaft 30 can be reduced by an amount by which the part of the speed reducer room 26 enters or is received in the electric motor room 24 in the axial direction of the rotary shaft 30. Thus, it is possible to increase mountability of the driving apparatus 48, particularly, in a small-sized electric vehicle.

Further, in the driving apparatus 48 of this second embodiment, the space S is defined by the part of the electric motor room 24, wherein the part of the electric motor room 24 overlaps with the part of the speed reducer room 26 as viewed in the radial direction of the rotary shaft 30 of the electric motor 14. The oil pump 50 configured to supply the first refrigerant into the electric motor room 24 is provided in the space S. Thus, the component required to operate the driving apparatus 48 also is housed in the electric motor room 24, and overlaps with the speed reducer room 26 in the axial direction of the rotary shaft 30, so that the driving apparatus 48 can be made more compact.

Third Embodiment

FIG. 3 is a view schematically showing a driving apparatus 52 for the electric vehicle 10, which is constructed according to a third embodiment of the present invention. As shown in FIG. 3, the driving apparatus 52 is similar with the driving apparatus 12 of the first embodiment shown in FIG. 1, except that the first housing portion 20*f* and the electric motor room 24 are placed laterally rather than longitudinally, and that a speed reducer 60 is provided in the speed reducer room 26. That is, in the driving apparatus 52, the rotary shaft 30 of the electric motor 14 extends in the lateral direction of the vehicle 10 that is perpendicular to the longitudinal direction of the vehicle 10 in which the vehicle 10 is to run. In the speed reducer 60, the output shaft 36 and a counter shaft 54 are parallel to the input shaft 34 that is connected in series to the rotary shaft 30 of the electric motor 14. First pair of reduction gears 56 are provided between the input shaft 34 and the counter shaft 54. Second pair of reduction gears 58 are provided between the counter shaft 54 and the output shaft 36.

In the driving apparatus 52 of this third embodiment, too, the part of the speed reducer room 26 enters or is received in the electric motor room 24 in the axial direction of the rotary shaft 30 of the electric motor 14, so that the total length L of the housing 20 in the axial direction of the rotary shaft 30 can be reduced by an amount by which the part of the speed reducer room 26 enters or is received in the electric motor room 24 in the axial direction of the rotary shaft 30. Thus, it is possible to increase mountability of the driving apparatus 48, particularly, in a small-sized electric vehicle.

Further, in the driving apparatus 52 of this third embodiment, the space S is defined by the part of the electric motor room 24, wherein the part of the electric motor room 24 overlaps with the part of the speed reducer room 26 as viewed in the radial direction of the rotary shaft 30 of the electric motor 14. The power cables 46 connected to the electric motor 14 are provided in the space S. Thus, the component required to operate the driving apparatus 52 also is housed in the electric motor room 24, and overlaps with the speed reducer room 26 in the axial direction of the rotary shaft 30, so that the driving apparatus 52 can be made more compact.

Fourth Embodiment

Figure 4:
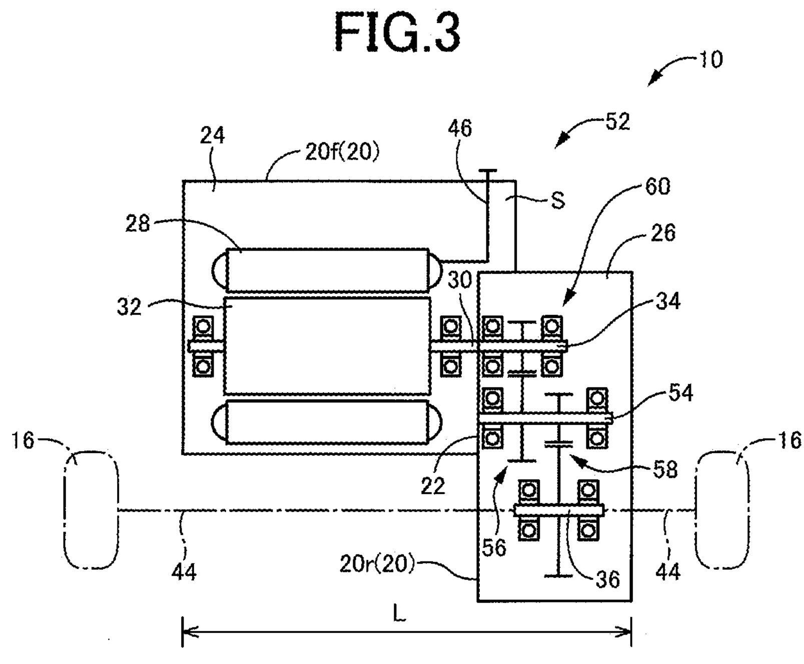
FIG. 4 is a view schematically showing a driving apparatus for an electric vehicle, which is constructed according to a fourth embodiment of the present invention.

FIG. 4 is a view schematically showing a driving apparatus 62 for the electric vehicle 10, which is constructed according to a fourth embodiment of the present invention. As shown in FIG. 4, the driving apparatus 62 is similar with the driving apparatus 48 of the second embodiment shown in FIG. 2, except that the housing 20 is partitioned by the partition wall 22 into the electric motor room 24 in which two electric motors 14 (i.e., first and second electric motors 14) are housed and the speed reducer room 26 in which two speed reducers 64 (i.e., first and second speed reducers 64) are housed. The first and second electric motors 14 are located in respective positions that are symmetrical to each other with respect to a widthwise center line C of the electric motor room 24. The first and second speed reducers 64 are located in respective positions that are symmetrical to each other with respect to the widthwise center line C. In each of the first and second speed reducers 64, the counter shaft 54 is parallel to the input shaft 34, while the output shaft 36 is perpendicular to the input shaft 34. The first pair of reduction gears 56 are provided between the input shaft 34 and the counter shaft 54 in each of the first and second speed reducers 64. The pair of reduction gears 42 consisting of the small-diameter bevel gear 38 and the large-diameter bevel gear 40 are provided between the counter shaft 54 and the output shaft 36 in each of the first and second speed reducers 64.

In the driving apparatus 62 of this fourth embodiment, too, the part of the speed reducer room 26, which corresponds to one of opposite end portions of the speed reducer room 26 that is closer to the electric motors 14, enters or is received in the electric motor room 24 in the axial direction of the rotary shaft 30 of each of the electric motors 14, so that the total length L of the housing 20 in the axial direction of the rotary shaft 30 can be reduced by an amount by which the part of the speed reducer room 26 enters or is received in the electric motor room 24 in the axial direction of the rotary shaft 30. Thus, it is possible to increase mountability of the driving apparatus 62, particularly, in a small-sized electric vehicle.

Further, in the driving apparatus 62 of this fourth embodiment, the space S is defined by the part of the electric motor room 24, wherein the part of the electric motor room 24 overlaps with the part of the speed reducer room 26 as viewed in the radial direction of the rotary shaft 30 of each of the electric motors 14. The oil pump 50 configured to supply the first refrigerant into the electric motor room 24 is provided in the space S. Thus, the component required to operate the driving apparatus 62 also is housed in the electric motor room 24, and overlaps with the speed reducer room 26 in the axial direction of the rotary shaft 30, so that the driving apparatus 62 can be made more compact. Further, the pair of drive wheels 16 are to be driven by the two electric motors 14, respectively, independently of each other, so that a differential gear device is not required.

While the preferred embodiments of this invention have been described in detail by reference to the drawings, it is to be understood that the invention may be otherwise embodied.

For example, in the above-described embodiments, a part of the speed reducer room 26 is received in the electric motor room 24 in the axial direction of the rotary shaft 30. However, all of the speed reducer room 26 may be received in the electric motor room 24 in the axial direction of the rotary shaft 30.

In the above-described first, second and third embodiments shown in FIGS. 1, 2 and 3, left-side surfaces of the respective electric motor room 24 and speed reducer room 26 in a running direction of the vehicle 10, i.e., their left side surfaces as seen in FIGS. 1, 2 and 3, are flush with each other. However, they do not have to be necessarily have to flush with each other.

In the above-described embodiments, the power cables 46 or the oil pump 50 is disposed in the space S is defined by the part of the electric motor room 24, wherein the part of the electric motor room 24 overlaps with the part of the speed reducer room 26 as viewed in the radial direction of the rotary shaft 30. However, both of the power cables 46 and the oil pump 50 may be disposed in the space S.

It is to be understood that the embodiments described above are given for illustrative purpose only, and that the present invention may be embodied with various modifications and improvements which may occur to those skilled in the art.

NOMENCLATURE OF ELEMENTS

10: electric vehicle
12; 48; 52; 62: driving apparatus
14: electric motor
16: drive wheel
18; 60; 64: speed reducer
20: housing
22: partition wall
24: electric motor room
26: speed reducer room
30: rotary shaft
32: rotor
34: input shaft
36: output shaft
42: pair of reduction gears
46: power cable
50: oil pump (fluid pump)
54: counter shaft
S: space

What is claimed is:

1. A driving apparatus for an electric vehicle, the driving apparatus comprising:

an electric motor including a rotary shaft and a rotor that is rotatably supported by the rotary shaft;

a speed reducer configured to reduce a speed of rotation of the rotary shaft of the electric motor and to output the rotation of the rotary shaft; and a housing that houses the electric motor and the speed reducer, wherein the housing is partitioned by a partition wall into a first portion including an electric motor room in which the electric motor is housed and a second portion including a speed reducer room in which the speed reducer is housed, wherein a first refrigerant used in the electric motor room is different from a second refrigerant used in the speed reducer room, and wherein an end portion of the second portion of the housing is inserted into the first portion of the housing such that a part of the speed reducer room is received in the electric motor room in an axial direction of the rotary shaft.

2. The driving apparatus according to claim 1, wherein a space is defined by a part of the electric motor room, the part of the electric motor room overlapping with at least the part of the speed reducer room as viewed in a radial direction of the rotary shaft, and wherein a power cable connected to the electric motor or a fluid pump configured to supply the first refrigerant into the electric motor room is provided in the space.

3. A driving apparatus for an electric vehicle, the driving apparatus comprising:

an electric motor including a rotary shaft and a rotor that is rotatably supported by the rotary shaft;

a speed reducer configured to reduce a speed of rotation of the rotary shaft of the electric motor and to output the rotation of the rotary shaft;

a housing that houses the electric motor and the speed reducer, wherein the housing is partitioned by a partition wall into an electric motor room in which the electric motor is housed and a speed reducer room in which the speed reducer is housed, wherein a first refrigerant used in the electric motor room is different from a second refrigerant used in the speed reducer room, and wherein at least a part of the speed reducer room is received in the electric motor room in an axial direction of the rotary shaft;

a second electric motor in addition to the electric motor; and a second speed reducer in addition to the speed reducer, wherein the electric motor and the second electric motor are housed in the electric motor room, and are located in respective positions that are symmetrical to each other with respect to a widthwise center line of the electric motor room, wherein the speed reducer and the second speed reducer are housed in the speed reducer room, and are located in respective positions that are symmetrical to each other with respect to the widthwise center line, wherein each of the speed reducer and the second speed reducer includes:

an input shaft connected in series to a corresponding one of the electric motor and the second electric motor;

a counter shaft disposed in parallel to the input shaft;

an output shaft disposed perpendicular to the counter shaft, and a pair of reduction gears which are disposed between the counter shaft and the output shaft and which consist of hypoid gears.

4. The driving apparatus according to claim 1, wherein a width of the electric motor room in a lateral direction is greater than a width of the speed reducer room in the lateral direction.

5. The driving apparatus according to claim 1, wherein the speed reducer includes an input shaft connected in series to the rotary shaft, an output shaft perpendicular to the input shaft, and a pair of reduction gears comprising a small-diameter bevel gear fixed to the input shaft and a large-diameter bevel gear fixed to the output shaft.

6. The driving apparatus according to claim 1, wherein a space is defined by a part of the first portion of the housing, the part of the first portion of the housing overlapping with a part of the second portion of the housing as viewed in a radial direction of the rotary shaft, and wherein a power cable connected to the electric motor is in the space.

7. The driving apparatus according to claim 1, wherein a space is defined by a part of the first portion of the housing, the part of the first portion of the housing overlapping with a part of the second portion of the housing as viewed in a radial direction of the rotary shaft, and wherein a fluid pump configured to supply the first refrigerant into the electric motor room is in the space.

8. The driving apparatus according to claim 1, wherein the rotary shaft and an input shaft of the speed reducer are connected in series to each other through the partition wall.

* * * * *